(12) United States Patent
Chene

(10) Patent No.: US 9,156,556 B2
(45) Date of Patent: Oct. 13, 2015

(54) METHOD AND DEVICE FOR USING HOT AIR TO DE-ICE THE LEADING EDGES OF A JET AIRCRAFT

(71) Applicant: Airbus Operations S.A.S., Toulouse (FR)

(72) Inventor: Gilles Chene, Toulouse (FR)

(73) Assignee: Airbus Operations S.A.S. (FR)

( * ) Notice: Subject to any disclaimer, the term of this patent is extended or adjusted under 35 U.S.C. 154(b) by 120 days.

(21) Appl. No.: 14/132,018

(22) Filed: Dec. 18, 2013

(65) Prior Publication Data

US 2014/0203146 A1 Jul. 24, 2014

(30) Foreign Application Priority Data

Dec. 18, 2012 (FR) ...................................... 12 62185

(51) Int. Cl.
*B64D 15/06* (2006.01)
*B64D 15/04* (2006.01)

(52) U.S. Cl.
CPC ...................................... *B64D 15/04* (2013.01)

(58) Field of Classification Search
CPC ................................ B64D 15/02; B64D 15/04
See application file for complete search history.

(56) References Cited

U.S. PATENT DOCUMENTS

| 4,741,499 A | 5/1988 | Rudolph et al. |
| 4,976,397 A * | 12/1990 | Rudolph et al. ........... 244/134 B |
| 8,511,179 B2 * | 8/2013 | Kelnhofer et al. ........ 73/861.351 |
| 2006/0196994 A1 | 9/2006 | Chow et al. |
| 2011/0031353 A1 | 2/2011 | Stolte et al. |
| 2011/0247432 A1 * | 10/2011 | Kelnhofer et al. ........ 73/861.351 |

FOREIGN PATENT DOCUMENTS

| GB | 557905 | * 12/1941 |
| WO | 2009/127652 A2 | 10/2009 |

* cited by examiner

*Primary Examiner* — Philip J Bonzell
(74) *Attorney, Agent, or Firm* — Lerner, David, Littenberg, Krumholz & Mentlik, LLP

(57) ABSTRACT

A de-icing device includes a hot air circuit including an inlet for hot air bled from an engine, and a duct connecting the inlet to an outlet of the circuit which opens towards the leading edge. The device also includes electrical heating means associated with the duct, and control means for controlling the heating means connected to detection means that detect the temperature of the hot air downstream of the heating means and are able to activate these if the detected temperature of the bled air is below a value corresponding to a minimum temperature required for de-icing, increased by a predetermined margin. The range of temperatures of the hot air supplied to the leading edge is lowered overall, whereas the minimum de-icing temperature is assured. Composite materials can be used near the leading edge without being damaged.

16 Claims, 2 Drawing Sheets

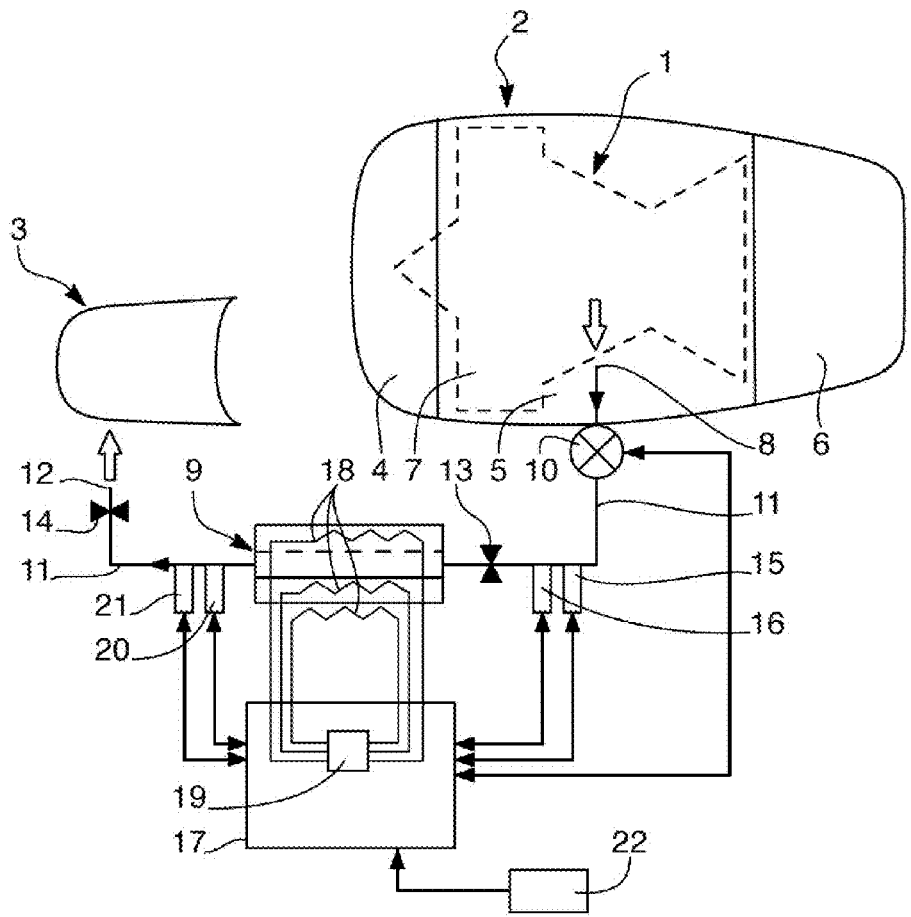
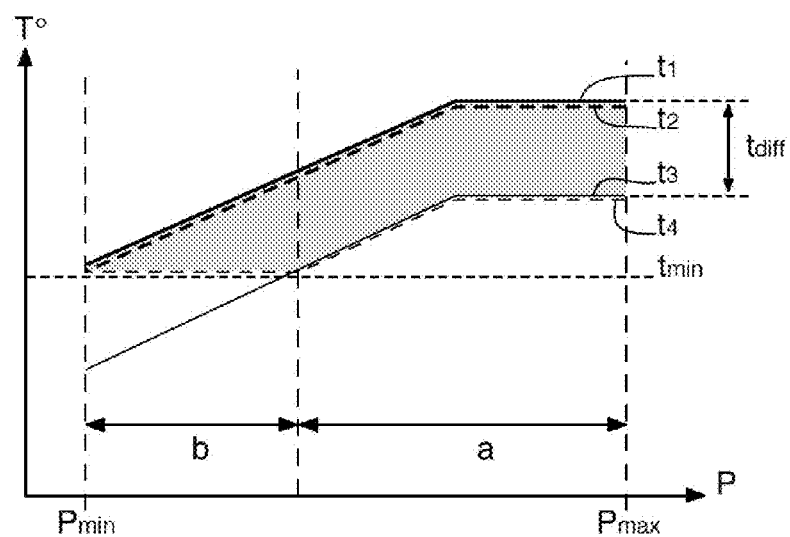
Fig. 1
Fig. 2

METHOD AND DEVICE FOR USING HOT AIR TO DE-ICE THE LEADING EDGES OF A JET AIRCRAFT

TECHNICAL FIELD

The present invention relates to a method and a device for using hot air for de-icing the leading edges of a jet aircraft.

BACKGROUND OF THE INVENTION

The leading edges of a jet plane consist mainly of the lip at the front end of the air inlet cowl of the jet engines and the slat formed by the forward edge of each wing. These leading edges are particularly exposed to the formation of ice under unfavourable temperature and humidity conditions.

The formation of ice on the lip of the air inlet cowl is liable to alter the aerodynamics in this inlet and thus disturb the passage of air towards the fan of the engine.

The formation of ice on the leading edges of the wings is also liable to adversely affect the aerodynamics of the wings by increasing their drag and reducing their lift.

As a result, it is necessary to make provision for de-icing these leading edges if need be.

One very commonplace solution is to use hot air bled from a compressor stage of the engine. This hot air is carried under pressure by the ducts of an air circulation circuit opening near the leading edge that needs to be protected against the formation of ice or that needs to be de-iced.

This solution affords many advantages because the power required can be taken directly from the engines, the air circulation circuit is lightweight, consisting essentially of hollow elements, and inexpensive. Furthermore, it is robust and reliable.

However, when using this solution for de-icing it is absolutely essential to ensure that the temperature of the air near the leading edges does not drop below the minimum temperature required for de-icing. This minimum temperature is around 200° C.

This temperature is of necessity defined on the basis of a minimum engine operating condition, at low speed, so that this minimum de-icing temperature is assured under these conditions.

This minimum engine operating condition appears in particular when the aircraft is flying at low engine speeds under what is sometimes very troublesome icing conditions, often at an altitude of between 15000 and 20000 feet for a period of the order of 45 minutes.

Modern jet engine optimization means that when these engines are developing their maximum power, the temperature of the air bled from a compressor stage of the engine may, in an engine maximum operation condition at high speed, be as high as 400° C. or even 600° C.

Now, a temperature as high as this is incompatible with the composite materials increasingly used in an attempt to reduce the weight of the aircraft. Nowadays, over 50% of the elements of a commercial airliner are made of these composite materials. The consequence of this is that elements made of composite material can sometimes be found at points which, at least intermittently, can be exposed to relatively high temperatures.

For this reason, it is absolutely essential to protect some of the elements made of composite material against heat. This entails the addition of protective elements (refer for example to Patent Application FR 2823533) which therefore represent an undesirable additional weight and make the structure more complicated.

BRIEF SUMMARY OF THE INVENTION

An aspect of the invention proposes a method and a device for using hot air to de-ice the leading edges of aircraft which are capable of overcoming the disadvantages of the prior art associated with the high temperatures near the leading edges that need to be de-iced.

One aspect of the invention is a method for using hot air to de-ice at least one leading edge of an aircraft comprising at least one jet engine, the method comprising the following phases:
  bleeding hot air from the at least one jet engine,
  conveying the bled hot air to the at least one leading edge,
  ensuring that the hot air reaching the at least one leading edge is at a temperature higher than or equal to a minimum temperature required for de-icing the at least one leading edge.

This method is characterized in that it envisages:
  bleeding from the at least one engine hot air which, under minimum power operating conditions of the said at least one engine, is at a temperature lower than the said minimum de-icing temperature, and
  electrically heating the bled hot air so that the temperature of the hot air reaching the at least one leading edge is at least equal to the minimum de-icing temperature.

An aspect of the invention thus makes it possible to appreciably low the temperature range of the hot air supplied to these leading edges while at the same time ensuring that the minimum de-icing temperature is achieved under all engine operating conditions.

Further, the device according to an embodiment of the invention improves the flexibility of the known devices that use hot air for de-icing.

According to other features of the method according to an aspect of the invention, the plan is to bleed from the at least one engine hot air which, under maximum power operating conditions of the at least one engine, is at a temperature higher than or equal to the minimum de-icing temperature but low enough not to damage aircraft structural elements made of composite material.

Another aspect of the invention provides a device for using hot air to de-ice at least one leading edge of an aircraft comprising a jet engine, the device comprising a pressurized hot air circuit comprising an inlet for hot air bled from the at least one engine and at least one duct connecting the inlet to an outlet of the circuit which opens towards the at least one leading edge. This device is characterized in that it further comprises electrical heating means associated with the at least one duct and control means for controlling the electrical heating means which are connected to detection means that detect the temperature of the hot air downstream of the electrical heating means and are able to activate these if the detected temperature of the bled air is below a value corresponding to a minimum temperature required for de-icing, increased by a predetermined margin.

According to other possible features of the device:
  the electrical heating means are associated with the at least one duct over at least part of the length thereof;
  the device further comprises temperature detection means positioned upstream of the electrical heating means;
  pressure detection means for detecting the pressure of the bled air are positioned upstream and downstream of the electrical heating means and connected to the control means;

the control means comprise a controller controlling a supply of electrical power to the electrical heating means, the supply of electrical power being variable according to the detection of the air temperature downstream of the electrical heating means;

the controller also receives flight parameters and engine operating parameters;

several hot air ducts associated with the electrical heating means are positioned in parallel with one another forming a set connected at one end to the inlet and at the other end to the outlet for the bled air;

several hot air ducts associated with the electrical heating means are arranged in series with one another forming a set connected at one end to the inlet and at the other end to the outlet for the bled air;

several hot air ducts associated with the electrical heating means are positioned both in parallel and in series with one another forming a set connected at one end to the inlet and at the other end to the outlet for the bled air;

the electrical heating means extend over the entire periphery of the at least one duct;

the at least one duct associated with the electrical heating means has a star-shaped outline in cross section;

the at least one duct associated with the electrical heating means has two parallel interior walls connecting two opposite walls of the duct and between which an electrical heating means is sandwiched; and the electrical heating means comprises resistive mats.

Another aspect of the invention provides an aircraft comprising at least one de-icing device having the features mentioned hereinabove.

BRIEF DESCRIPTION OF THE DRAWINGS

Further features and advantages of the invention will become apparent from the following description of one non-limiting embodiment of the invention, given with reference to the attached figures in which:

FIG. 1 is a schematic overview of the device according to one embodiment of the invention;

FIG. 2 is a diagram showing the temperature of the bled air as a function of engine power;

DETAILED DESCRIPTION

Figure 3:
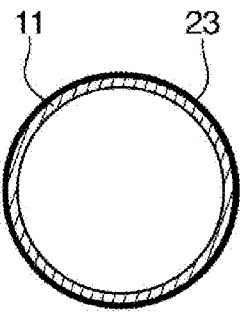
FIG. 3 shows, in a section A-A of FIG. 6, a circular hot air duct the periphery of which is covered with a resistive mat.

In the figures, elements which are identical or equivalent will bear the same reference signs.

FIG. 1 schematically shows the hot air de-icing device according to an embodiment of the invention.

The hot air bled from a jet engine 1 is symbolized by an arrow in FIG. 1. The jet engine 1 is housed in a nacelle 2 borne by the fuselage of an aircraft (not illustrated in the figures).

FIG. 1 shows just one leading edge, namely a lip 3 of an air inlet cowl 4 followed by a central cowl 5 surrounding the engine 1, and finally a jet pipe cowl 6.

The hot air is bled under pressure from a stage (not depicted) of a compressor 7 positioned upstream of the engine 1. The hot air is bled by an inlet 8 of a hot air circulation circuit 9 passing through a flow regulating valve 10 which also acts as an isolation valve so that the flow can be switched on and off according to the need for a supply of hot air.

The pressurized hot air passes along the ducts 11 of the circulation circuit 9 to be conveyed to an outlet 12 opening towards the leading edges, which are represented by the lip 3 in FIG. 1. However, a leading edge here means any leading edge of an aircraft, particularly also the leading slat of each wing.

A calibrated orifice 13 is fitted to the start of the hot air circulation circuit 9 and with the regulating valve 10 is used to regulate the hot air flow entering the circulation circuit 9. A second calibrated orifice 14 is preferably positioned towards the end of the duct 11 to regulate the hot air flow leaving towards the leading edges so as to protect these from being oversupplied with hot air in the event of a defective duct 11. For the same reason, a pressure sensor 15 and a temperature sensor 16 are positioned in the duct 11 in order to detect the pressure and temperature therein. The sensors 15, 16 are connected to a control device 17 which from these sensors receives signals indicative of the respective measured values. The control device 17 is connected to the regulating and isolating valve 10 to control the flow passing through it according to the pressure and temperature values detected.

According to one embodiment of the invention, the hot air de-icing device comprises electrical heating means 18 associated with at least one of the ducts 11 of the hot air circulation circuit 9. The hot air de-icing device further comprises control means 19 for controlling the electrical heating means 18. The control means 19 advantageously comprise a controller incorporated into the control device 17 that controls the regulating and isolating valve 10.

Hot air temperature detection means 20 positioned downstream of the electrical heating means 18 are connected to the control means 19. The latter are able to activate the electrical heating means if the detected temperature of the bled air is below a value corresponding to a minimum temperature $t_{min}$ required for de-icing, increased by a predetermined margin. This margin preferably corresponds to around 10° C.

A second pressure sensor 21 is advantageously positioned downstream of the electrical heating means 18.

In order to take into consideration changes in the flight conditions, the control means 19 are connected to the control system 22 of the aircraft so as to receive there from flight parameters and engine parameters such as the altitude, airspeed, external temperature and engine speed.

The diagram in FIG. 2 illustrates the effect of using electrical heating means 18 as top-up heating if need be. The diagram shows the temperature (T°) of the bled air as a function of the power developed by the corresponding engine.

The engine power increases from a minimum power $P_{min}$ to a maximum power $P_{max}$. The two upper parallel curves illustrate, as a function of engine power, how the temperature of the bled air conveyed by a known hot air de-icing device evolves, while the two lower curves, which are partially parallel, illustrate how the temperature of the bled air conveyed by a hot air de-icing device according to one embodiment of the invention evolves.

The upper curve in continuous line shows the evolution of the temperature t1 of the bled air at the inlet 8 (see FIG. 1) and the upper curve in discontinuous line shows the evolution of the temperature t2 of the air leaving towards a leading edge.

When the engine power corresponds to the maximum power $P_{max}$, the temperature t1 of the air bled from a compressor stage of the engine is relatively high, of the order of 400 to 600° C. This temperature remains at substantially that same level through a range of high powers and then decreases practically linearly with the decrease in power until the minimum engine power $P_{min}$ is developed.

At that point, the curve t2 practically meets the horizontal line marking the minimum temperature $t_{min}$ required for de-icing. This minimum temperature is of the order of 200° C. It will be noted that the curve t2 in discontinuous line remains parallel to the curve t1 in continuous line from $P_{max}$ to $P_{min}$.

It is also clear from the diagram of FIG. 2 that in the engine high power operating condition, the temperature t1 at the inlet of the hot air de-icing device cannot be lowered without consequences. More specifically, the temperature of the air leaving towards the leading edge that has to be de-iced would in this case drop below the minimum temperature $t_{min}$ required when the engine is operating in conditions at low engine powers down to minimum power.

In the hot air de-icing device according to one embodiment of the invention, the temperature (t3) of the air bled from the engine is lowered by 100° to 200° C. ($t_{diff}$) with respect to the temperature curve t1, something that can be done quite simply by bleeding the air from an engine compressor stage that is not as high as is done in the known de-icing device.

The lower curve in continuous line shows the evolution of the temperature t3 of the bled air at the inlet 8 of the air circulation circuit 9 and the lower curve in discontinuous line shows the evolution of the temperature t4 of the air leaving to reach a leading edge.

It will be noted that the temperature curves t3 and t4 starting from maximum power $P_{max}$ run parallel to the curves t1 and t2 relating to the known hot air de-icing device. The temperature curves t3 and t4 are thus uniformly shifted towards lower temperatures by comparison with the temperatures indicated by temperature curves t1 and t2.

The consequence of this is that the temperature curves t3 and t4 more quickly reach the minimum temperature $t_{min}$ than do the temperature curves t1 and t2 when the corresponding engine power decreases.

The power developed by the engine lies, starting from maximum power $P_{max}$, initially in a power range labelled "a" in FIG. 2 and which decreases towards medium or low powers. This range "a" ends when the reduced power of the engine causes a drop in the temperature of the bled air such that it is close to the minimum temperature $t_{min}$ required for de-icing.

The range "a" of powers is followed by a range of powers "b" corresponding to powers that lead to bled air temperatures at the inlet 8 which fall below the minimum temperature $t_{min}$ required for de-icing (refer to the lower curve in solid line).

In order to prevent the temperature of the leaving air dropping below the minimum required temperature $t_{min}$, the control means 19 that control the heating means 18 actuate the electrical heating means 18. In this way, the temperature curve t4 is straightened out so that it runs parallel to the line marking the minimum temperature $t_{min}$, slightly above this line. The electrical heating means 18 remain active throughout the range of powers "b" which extends down to the minimum power $P_{min}$ of the engine.

The temperature of the air downstream of the electrical heating means 18 is continuously detected by the temperature detection means 20. The control means 19 vary the electrical power in the electrical heating means 18 as a function of the temperature detected in order to stabilize it above the minimum temperature $t_{min}$ required for de-icing.

In this way, a significant reduction in the temperature of the air reaching the leading edge that is to be de-iced is obtained such that elements made of composite material used in nearby structures no longer require specific protection against heat.

The whole range of temperatures of the air entering the circulation circuit and of the air leaving it is thus effectively shifted downwards by the order of 100 to 200° C. That is the case of all engine speeds up to the point where the temperature (t4) of the leaving air is below the minimum required temperature ($t_{min}$), increased by a predetermined margin. From that moment on, the electrical heating is switched on to keep the temperature of the leaving air above this minimum temperature.

For this top-up electrical heating, the electrical heating means 18 extend over at least part of the duct or ducts 11 of the hot air circulation circuit 9.

The electrical heating means 18 advantageously comprise resistive mats 23 which can easily be applied to the exterior surfaces of the ducts and adapted to suit the shape thereof.

Figure 4:
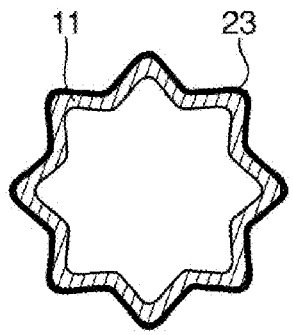
FIG. 4 shows, in a section A-A of FIG. 6, a star-shaped hot air duct the periphery of which is covered with a resistive mat.
Figure 5:
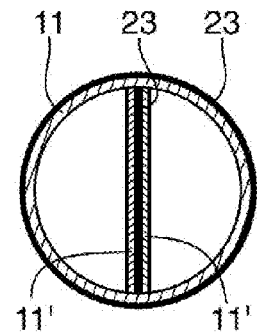
FIG. 5 shows, in a section A-A of FIG. 6, a circular hot air duct the periphery of which is covered by a resistive mat and which has two parallel interior walls sandwiching a resistive mat.
Figure 6:
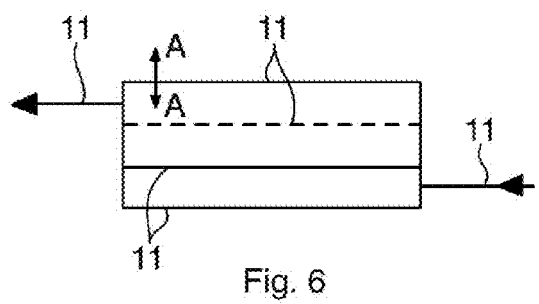
FIG. 6 schematically shows a set of several hot air ducts arranged in parallel.

FIGS. 3 to 5 show sections A-A through a hot air duct 11 of FIG. 6. In FIG. 3, the duct 11 has a circular shape and the resistive mat 23 extends around the entire periphery of the duct 11.

The cross section in FIG. 4 shows a hot air duct 11 the star shape of which is intended to increase the exterior surface area of the duct 11 heated by the resistive mat 23. In this case also, the resistive mat 23 extends over the entire periphery of this hot air duct 11.

Another possible way of increasing the surface area of the duct that is heated by a resistive mat 23 is illustrated in FIG. 5. The circular hot air duct 11 of FIG. 3 has, in this figure, been supplemented by two parallel interior walls 11' connecting two opposite walls of the duct and between which a resistive mat 23 is sandwiched.

Figure 7:
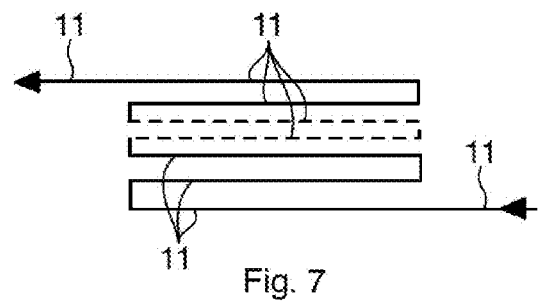
FIG. 7 schematically shows a set of several hot air ducts arranged in series.
Figure 8:
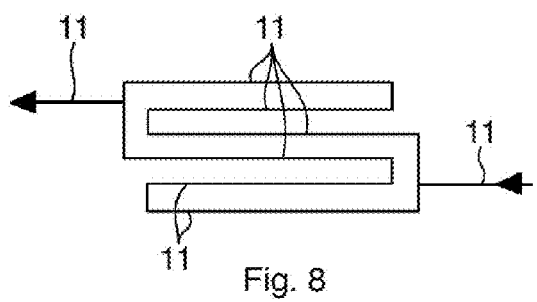
FIG. 8 schematically shows a set of several hot air ducts arranged in parallel and in series.

FIGS. 6 to 8 schematically show sets formed by several hot air ducts 11 arranged in different ways.

FIG. 6 shows several hot air ducts 11 arranged in parallel with one another forming a set connected at one end to the inlet 8 and at the other end to the outlet 12 for the hot air.

FIG. 7 shows several hot air ducts 11 arranged in series with one another forming a set connected at one end to the inlet 8 and at the other end to the outlet 12 for the hot air. The hot air ducts 11 may be arranged in a meandering path as illustrated in FIG. 7 so that the electrically heated ducts are grouped more compactly together, or alternatively they may be arranged one after the other.

FIG. 8 shows several hot air ducts 11 in a combination of the arrangements illustrated in FIGS. 6 and 7. The ducts are arranged both in parallel and in series with one another forming a set connected at one end to the inlet 8 and at the other end to the outlet 12 for the hot air.

Of course, the invention applies to all the leading edges of an aircraft and is not restricted to the examples illustrated and described. Therefore a person skilled in the art will be able to devise variants without thereby departing from the scope of the invention.

The invention claimed is:

1. A method for using hot air to de-ice at least one leading edge of an aircraft comprising at least one jet engine, the method comprising:
bleeding hot air from the at least one jet engine,
conveying the bled hot air to the at least one leading edge, ensuring that the hot air reaching the at least one leading edge is at a temperature higher than or equal to a minimum temperature ($t_{min}$) required for de-icing the said at least one leading edge, wherein the bleeding from the at least one engine hot air which, under minimum power ($P_{min}$) operating conditions of the at least one engine, is at a temperature lower than the minimum de-icing temperature ($t_{min}$), and electrically heating the bled hot air so that the temperature (t4) of the hot air reaching the at least one leading edge is at least equal to the minimum de-icing temperature ($t_{min}$).

2. The method for using hot air for de-icing according to claim 1, wherein bleeding from the at least one engine hot air which, under maximum power ($P_{max}$) operating conditions of the at least one engine, is at a temperature higher than or equal to the minimum de-icing temperature ($t_{min}$) but low enough not to damage aircraft structural elements made of composite material.

3. A device for using hot air to de-ice at least one leading edge of an aircraft comprising a jet engine, the device comprising:
    a pressurized hot air circuit comprising an inlet for hot air bled from the jet engine;
    at least one duct connecting the inlet to an outlet of the circuit and opening towards the at least one leading edge;
    electrical heating means associated with the at least one duct; and
    control means for controlling the electrical heating means and connected to detection means that detect the temperature of the hot air downstream of the electrical heating means and configured to activate the electrical heating means if the detected temperature of the bled air is below a value corresponding to a minimum temperature ($t_{min}$) required for de-icing, increased by a predetermined margin.

4. The device for using hot air for de-icing according to claim 3, wherein the electrical heating means is associated with the at least one duct over at least part of the length thereof.

5. The device for using hot air for de-icing according to claim 3, further comprising temperature detection means positioned upstream of the electrical heating means.

6. The device for using hot air for de-icing according to claim 3, further comprising detection means for detecting the pressure of the bled air positioned upstream and downstream of the electrical heating means and connected to the control means.

7. The device for using hot air for de-icing according to claim 3, wherein the control means comprise a controller controlling a supply of electrical power to the electrical heating means, the supply of electrical power being variable according to the detection of the air temperature downstream of the electrical heating means.

8. The device for using hot air for de-icing according to claim 7, wherein the controller receives flight parameters and engine operating parameters.

9. The device for using hot air for de-icing according to claim 3, further comprising a plurality of hot air ducts associated with the electrical heating means positioned in parallel with one another forming a set connected at one end to the inlet and at the other end to the outlet for the bled air.

10. The device for using hot air for de-icing according to claim 3, further comprising a plurality of hot air ducts associated with the electrical heating means arranged in series with one another forming a set connected at one end to the inlet and at the other end to the outlet for the bled air.

11. The device for using hot air for de-icing according to claim 3, further comprising a plurality of hot air ducts associated with the electrical heating means positioned both in parallel and in series with one another forming a set connected at one end to the inlet and at the other end to the outlet for the bled air.

12. The device for using hot air for de-icing according to claim 3, wherein the electrical heating means extend over the entire periphery of the at least one duct.

13. The device for using hot air for de-icing according claim 3, wherein the at least one duct associated with the electrical heating means has a star-shaped outline in cross section.

14. The device for using hot air for de-icing according claim 3, wherein the at least one duct associated with the electrical heating means has first and second parallel interior walls connecting first and second opposite walls of the duct and between which an electrical heating means is sandwiched.

15. The device for using hot air for de-icing according claim 3, wherein the electrical heating means comprises resistive mats.

16. An aircraft comprising at least one de-icing device, the de-icing device comprising:
    a pressurized hot air circuit comprising an inlet for hot air bled from the jet engine;
    at least one duct connecting the inlet to an outlet of the circuit and opening towards the at least one leading edge;
    electrical heating means associated with the at least one duct; and
    control means for controlling the electrical heating means and connected to detection means that detect the temperature of the hot air downstream of the electrical heating means and configured to activate the electrical heating means if the detected temperature of the bled air is below a value corresponding to a minimum temperature ($t_{min}$) required for de-icing, increased by a predetermined margin.

* * * * *